(12) United States Patent
Cho et al.

(10) Patent No.: US 9,799,251 B2
(45) Date of Patent: Oct. 24, 2017

(54) DISPLAY DEVICE, MOBILE DEVICE, SYSTEM INCLUDING THE SAME, AND IMAGE QUALITY MATCHING METHOD THEREOF

(71) Applicant: SAMSUNG ELECTRONICS CO., LTD., Suwon-si (KR)

(72) Inventors: Kyung-sun Cho, Seoul (KR); Jae-hyun Kim, Seoul (KR); Sang-bae Park, Cheongju-si (KR); Min-Hyok Bang, Anyang-si (KR); Keum-ok Lee, Suwon-si (KR); Dong-jin Lee, Suwon-si (KR); Jung-kun Lee, Seoul (KR); Jae-hoon Jeong, Suwon-si (KR); Seong-seol Hong, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 28 days.

(21) Appl. No.: 14/625,850

(22) Filed: Feb. 19, 2015

(65) Prior Publication Data

US 2015/0242178 A1    Aug. 27, 2015

(30) Foreign Application Priority Data

Feb. 24, 2014    (KR) .................. 10-2014-0021511

(51) Int. Cl.
*G09G 3/20*    (2006.01)
*G06F 3/14*    (2006.01)
(Continued)

(52) U.S. Cl.
CPC ............. *G09G 3/20* (2013.01); *G01J 3/506* (2013.01); *G06F 3/1446* (2013.01);
(Continued)

(58) Field of Classification Search
CPC ... G09G 2320/0693; G09G 2320/0233; G09G 2320/0666; G09G 3/006; G09G 2300/026;
(Continued)

(56) References Cited

U.S. PATENT DOCUMENTS 8,836,797 B1 * 9/2014 Rykowski .............. G09G 3/006
345/589
2003/0156073 A1    8/2003 Van Zon
(Continued)

FOREIGN PATENT DOCUMENTS

WO    2007/029997 A1    3/2007

OTHER PUBLICATIONS

Communication dated Feb. 15, 2016, issued by the European Patent Office in counterpart European Patent Application No. 15153067.2.
(Continued)

*Primary Examiner* — Koosha Sharifi-Tafreshi
(74) *Attorney, Agent, or Firm* — Sughrue Mion, PLLC

(57) ABSTRACT

A display device, a mobile device, a system including the same, and an image quality matching method thereof are provided. According to the method, the mobile device acquires a first acquired image that is an image of a first displayed image being displayed on the first display device and a second acquired image that is an image of a second displayed image being displayed on the second display device, compares the first acquired image and the second acquired image with each other, determines an image quality correction value for the first display device so that an image quality of the first displayed image is made substantially equal to an image quality of the second displayed image, and transmits the determined image quality correction value to the first display device or the second display device.

7 Claims, 11 Drawing Sheets

(51) Int. Cl.
*H04N 1/60* (2006.01)
*G01J 3/50* (2006.01)
*H04N 9/68* (2006.01)
*G01J 3/46* (2006.01)

(52) U.S. Cl.
CPC .............. *H04N 1/6052* (2013.01); *H04N 9/68* (2013.01); *G01J 2003/466* (2013.01); *G09G 2320/0693* (2013.01); *G09G 2354/00* (2013.01); *G09G 2360/145* (2013.01)

(58) Field of Classification Search
CPC .......... G09G 2320/0242; G06F 3/1446; G06F 3/147; H04N 17/00
USPC .................................................... 345/1.1, 1.3
See application file for complete search history.

(56) References Cited

U.S. PATENT DOCUMENTS

| | | | |
|---|---|---|---|
| 2004/0174323 A1* | 9/2004 | Yamashita | G09G 3/006 345/75.2 |
| 2008/0309884 A1 | 12/2008 | O'Dor et al. | |
| 2009/0122132 A1 | 5/2009 | Thielman | |
| 2012/0014593 A1* | 1/2012 | Jaynes | H04N 1/6055 382/165 |
| 2013/0120589 A1* | 5/2013 | Chang | H04N 9/69 348/189 |
| 2013/0147860 A1* | 6/2013 | Ishida | G09G 5/10 345/690 |
| 2013/0169888 A1 | 7/2013 | Tannhäuser et al. | |
| 2014/0016041 A1 | 1/2014 | Kim et al. | |
| 2014/0159992 A1* | 6/2014 | Cai | G06F 3/1446 345/2.3 |
| 2014/0292616 A1* | 10/2014 | Fear | G06F 3/1423 345/1.1 |
| 2015/0201109 A1* | 7/2015 | Li | H04N 1/4074 348/222.1 |

OTHER PUBLICATIONS

Communication dated Oct. 13, 2015, issued by the European Patent Office in counterpart European Patent Application No. 15153067.2.

* cited by examiner

| 811 | 812 |
|---|---|
| R VALUE DIFFERENCE (R VALUE OF FIRST IMAGE - R VALUE OF SECOND IMAGE) | IMAGE QUALITY CORRECTION VALUE OF FIRST DISPLAY DEVICE(IMAGE QUALITY CORRECTION RANGE: 0 TO 100, OFFSET: 50) |
| 814 — R VALUE DIFFERENCE ≤ -50 | + 20 |
| 815 — -50 < R VALUE DIFFERENCE ≤ -40 | +16 |
| 816 — -40 < R VALUE DIFFERENCE ≤ -30 | +10 |
| 817 — -30 < R VALUE DIFFERENCE ≤ -20 | +6 |
| 818 — -20 < R VALUE DIFFERENCE ≤ -10 | +2 |
| 819 — -10 < R VALUE DIFFERENCE < 10 | CORRECTION END |
| 820 — 10 ≤ R VALUE DIFFERENCE < 20 | -2 |
| 821 — 30 ≤ R VALUE DIFFERENCE < 30 | -6 |
| 822 — 30 ≤ R VALUE DIFFERENCE < 40 | -10 |
| 823 — 40 ≤ R VALUE DIFFERENCE < 50 | -16 |
| 824 — R VALUE DIFFERENCE ≥ 50 | -20 |

| | R VALUE DIFFERENCE (R VALUE OF FIRST IMAGE - R VALUE OF SECOND IMAGE) [831] | IMAGE QUALITY CORRECTION VALUE OF FIRST DISPLAY DEVICE (IMAGE QUALITY CORRECTION RANGE: 0 TO 100, OFFSET: 50) [832] | IMAGE QUALITY CORRECTION VALUE OF SECOND DISPLAY DEVICE (IMAGE QUALITY CORRECTION RANGE: 0 TO 100, OFFSET: 50) [833] |
|---|---|---|---|
| 834 | R VALUE DIFFERENCE ≤ -50 | +10 | -10 |
| 835 | -50 < R VALUE DIFFERENCE ≤ -40 | +8 | -8 |
| 836 | -40 < R VALUE DIFFERENCE ≤ -30 | +5 | -5 |
| 837 | -30 < R VALUE DIFFERENCE ≤ -20 | +3 | -3 |
| 838 | -20 < R VALUE DIFFERENCE ≤ -10 | +1 | -1 |
| 839 | -10 < R VALUE DIFFERENCE < 10 | CORRECTION END | |
| 840 | 10 ≤ R VALUE DIFFERENCE < 20 | -1 | +1 |
| 841 | 30 ≤ R VALUE DIFFERENCE < 30 | -3 | +3 |
| 842 | 30 ≤ R VALUE DIFFERENCE < 40 | -5 | +5 |
| 843 | 40 ≤ R VALUE DIFFERENCE < 50 | -8 | +8 |
| 844 | R VALUE DIFFERENCE ≥ 50 | -10 | +10 |

| 851 | 852 |
|---|---|
| R VALUE DIFFERENCE (R VALUE OF FIRST IMAGE − R VALUE OF SECOND IMAGE) | IMAGE QUALITY CORRECTION VALUE OF FIRST DISPLAY DEVICE (IMAGE QUALITY CORRECTION RANGE: 0 TO 100, OFFSET: 50) |
| R VALUE DIFFERENCE ≤ -10 | + 4 |
| R VALUE DIFFERENCE ≥ 10 | − 4 |
| -10 < R VALUE DIFFERENCE < 10 | CORRECTION END |

| | R VALUE DIFFERENCE (R VALUE OF FIRST IMAGE − R VALUE OF SECOND IMAGE) | IMAGE QUALITY CORRECTION VALUE OF FIRST DISPLAY DEVICE (IMAGE QUALITY CORRECTION RANGE: 0 TO 100, OFFSET: 50) | IMAGE QUALITY CORRECTION VALUE OF SECOND DISPLAY DEVICE (IMAGE QUALITY CORRECTION RANGE: 0 TO 100, OFFSET: 50) |
|---|---|---|---|
| 874 | R VALUE DIFFERENCE ≤ -10 | +2 | -2 |
| 875 | R VALUE DIFFERENCE ≥ 10 | - 2 | +2 |
| 876 | -10 < R VALUE DIFFERENCE < 10 | CORRECTION END | |

871 / 872 / 873

DISPLAY DEVICE, MOBILE DEVICE, SYSTEM INCLUDING THE SAME, AND IMAGE QUALITY MATCHING METHOD THEREOF

CROSS-REFERENCE TO RELATED APPLICATION

This application claims the benefit, under 35 U.S.C. §119(a), from Korean Patent Application No. 10-2014-0021511, filed on Feb. 24, 2014, in the Korean Intellectual Property Office, the disclosure of which is incorporated herein by reference in its entirety.

BACKGROUND

1. Field

Methods and apparatuses consistent with exemplary embodiments relate to a display device, a mobile device, a system including the same, and an image quality matching method thereof, and more particularly to a display device, a mobile device, a system including the same, and an image quality matching method thereof, which can match an image quality between a plurality of display devices that display image.

2. Description of the Related Art

As the use of televisions (TVs) as common display devices is increased, environments, in which images are displayed using a plurality of TVs, have also increased. In the case of using a plurality of TVs, a user may display a plurality of images which are different from each other on the plurality of TVs or may display one image on the plurality of TVs.

In the case of displaying one image through the plurality of TVs, a user can approximate a single large screen using a plurality of inexpensive TVs without the necessity of purchasing an expensive large-screen TV. The large screen that is made up of the plurality of inexpensive TVs may provide the sense of absorption and grandeur to the user. Further, the large screen made up of the plurality of TVs may be installed in a public place to be used for the purpose of advertisement or propaganda.

SUMMARY OF THE INVENTION

In the case of approximating a single large screen using a plurality of TVs, there may be differences in image quality between images as displayed on the different TVs due to the differences between panels and image processors of the plurality of TVs. The differences in image quality among the plurality of TVs may be decreased through manual adjustment of the image qualities of the TVs. However, it is not easy for an ordinary person who is not a specialist to match the image qualities of the plurality of TVs.

Accordingly, there may be a need for a method for matching image qualities between a plurality of TVs to minimize a user's operations and a device using the method. According to one or more exemplary embodiments, differences in image quality among a plurality of TVs can be minimized. One or more exemplary embodiments may also address other problems that would be apparent to those of ordinary skill in the art.

According to one aspect of an exemplary embodiment, a mobile device that matches image qualities between a plurality of display devices includes an image acquirer configured to acquire a first image that is being displayed on a first display device and a second image that is being displayed on a second display device; a controller configured to compare the acquired first and second images with each other and to determine an image quality correction value of the first display device so that the image quality of the first image is made equal to or similar to the image quality of the second image; and a communicator configured to transmit the determined image quality correction value to the first display device.

The controller may determine the image quality correction value of the first display device so that a difference in image quality between the first image and the second image becomes equal to or lower than a predetermined value.

The controller may determine the image quality correction value of the first display device in consideration of a difference between a color value of a pixel included in the first image and a color value of a pixel included in the second image.

The first image that is being displayed on the first display device and the second image that is being displayed on the second display device have the same source.

According to an aspect of another exemplary embodiment, a system includes first and second display devices and a mobile device, wherein the mobile device acquires a first image that is being displayed on a first display device and a second image that is being displayed on a second display device, compares the acquired first and second images with each other, determines an image quality correction value of the first display device so that the image quality of the first image is made equal to or similar to the image quality of the second image, and transmits the determined image quality correction value to the first display device; and the first display device corrects the image quality of the image being displayed using the image quality correction value received from the mobile device.

According to an aspect of another exemplary embodiment, a display device that matches image qualities between a plurality of display devices includes a display configured to display a first image; an image acquirer configured to acquire a second image that is being displayed on an external display device; and a controller configured to compare the first image and the second image with each other, to determine an image quality correction value so that the image quality of the first image is made equal to or similar to the image quality of the second image, and to correct the image quality of the image being displayed on the display.

The display device according to the aspect of the present disclosure may further include a communicator configured to perform communication with the external display device, wherein the communicator receives the first image that is being displayed on the display from the external display device.

The display device according to the aspect of the present disclosure may further include a communicator configured to perform communication with the external display device, wherein the controller determines the image quality correction value of the external display device so that the image quality of the first image is made equal to or similar to the image quality of the second image, and the communicator transmits the determined image quality correction value to the external display device.

According to an aspect of another exemplary embodiment, a system includes a first display device and a second display device, wherein the second display device acquires a first image that is being displayed on the first display device and transmits the acquired first image to the first display device, and the first display device acquires a second image that is being displayed on the second display device, compares the acquired second image and the first image received from the second display device with each other, determines an image quality correction value of the first display device so that an image quality of the first image is made equal to or similar to an image quality of the second image, and corrects the image quality of the image being displayed using the determined image quality correction value.

According to an aspect of another exemplary embodiment, a display device that matches image qualities between a plurality of display devices includes a communicator configured to receive a first image that is being displayed on the display device and a second image that is being displayed on an external display device; and a controller configured to compare the first image and the second image with each other, to determine an image quality correction value so that the image quality of the first image is made equal to or similar to the image quality of the second image, and to correct the image quality of the image being displayed on the display device using the image quality correction value.

The controller may determine the image quality correction value of the external display device so that the image quality of the first image is made equal to or similar to the image quality of the second image, and the communicator transmits the determined image quality correction value to the external display device.

According to an aspect of another exemplary embodiment, a system includes a display device and a mobile device, wherein the mobile device acquires a first image that is being displayed on a first display device and a second image that is being displayed on a second display device, and transmits the first image and the second image to the first display device, and the display device compares the first image and the second image received from the mobile device with each other, determines an image quality correction value of the first display device so that the image quality of the first image is made equal to or similar to the image quality of the second image, and corrects the image quality of the image being displayed using the determined image quality correction value.

According to an aspect of another exemplary embodiment, a method for matching image qualities between a plurality of display devices of a mobile device includes acquiring a first image that is being displayed on a first display device and a second image that is being displayed on a second display device; comparing the first image and the second images with each other, and determining an image quality correction value of the first display device so that the image quality of the first image is made equal to or similar to the image quality of the second image; and transmitting the determined image quality correction value to the first display device.

The determining the image quality correction value of the first display device may include determining the image quality correction value of the first display device so that a difference in image quality between the first image and the second image becomes equal to or lower than a predetermined value.

The determining the image quality correction value of the first display device controller may include determining the image quality correction value of the first display device in consideration of a difference between a color value of a pixel included in the first image and a color value of a pixel included in the second image.

The first image that is being displayed on the first display device and the second image that is being displayed on the second display device have the same source.

According to an aspect of another exemplary embodiment, a method for matching image qualities between a plurality of display devices of a display device includes acquiring a second image that is being displayed on an external display device; and comparing a first image that is being displayed on the first display device and the second image with each other, determining an image quality correction value of the display device so that the image quality of the first image is made equal to or similar to the image quality of the second image, and correcting the image quality of the image being displayed on the display device using the determined image quality correction value.

The method for matching image qualities between a plurality of display devices according to the aspect of the present disclosure may further include receiving the first image that is being displayed on the display device from the external display device.

The method for matching image qualities between a plurality of display devices according to the aspect of the present disclosure may further include determining the image quality correction value of the external display device so that the image quality of the first image is made equal to or similar to the image quality of the second image; and transmitting the determined image quality correction value to the external display device.

According to an aspect of another exemplary embodiment, a method for matching image qualities between a plurality of display devices of a display device includes receiving a first image that is being displayed on the display device and a second image that is being displayed on an external display device; and comparing the first image and the second image with each other, determining an image quality correction value of the display device so that the image quality of the first image is made equal to or similar to the image quality of the second image, and correcting the image quality of the image being displayed on the display device using the determined image quality correction value.

The method for matching image qualities between a plurality of display devices according to the aspect of the present disclosure may further include determining the image quality correction value of the external display device so that the image quality of the first image is made equal to or similar to the image quality of the second image; and transmitting the determined image quality correction value to the external display device.

According to one or more exemplary embodiments, a user may be able to automatically match image qualities among the plurality of TVs using the mobile device or the TV provided with a camera. In this way, the user can easily approximate a single, large screen in which the image qualities are matched among the plurality of TVs irrespective of differences in the specifications among the plurality of TVs.

In addition, effects that can be obtained or predicted according to the following description are directly or suggestively disclosed herein.

BRIEF DESCRIPTION OF THE DRAWINGS

The above and other exemplary aspects, features and advantages will be more apparent from the following detailed description when taken in conjunction with the accompanying drawings, in which:

FIGS. 8A to 8D are diagrams illustrating tables in which image quality correction values of a first display device or a second display device according to an exemplary embodiment.

DETAILED DESCRIPTION OF EMBODIMENTS OF THE PRESENT INVENTION

Figure 1:
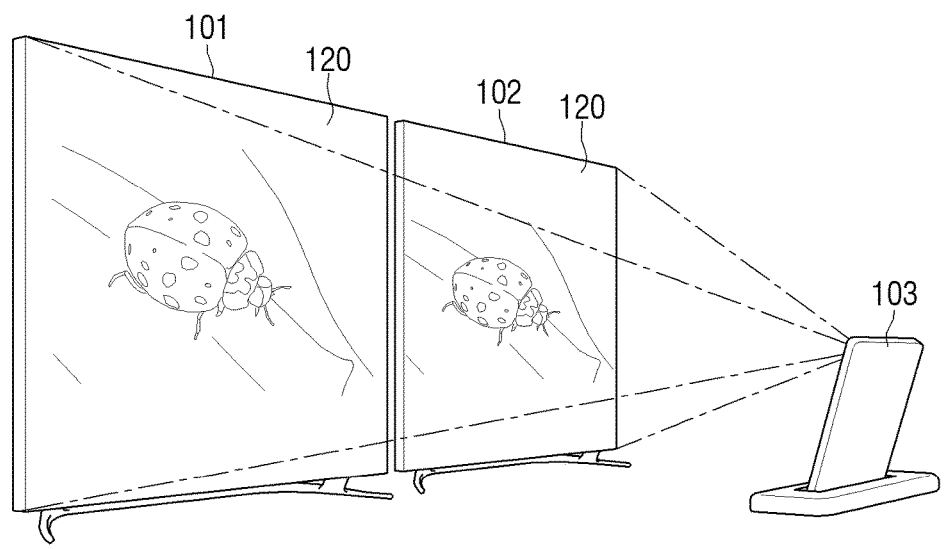
FIG. 1 is a view illustrating the configuration of a communication system according to an exemplary embodiment.

Hereinafter, representative embodiments to achieve the above-described technical subjects will be described. For convenience in explanation, the same titles may be used for defined objects. However, the titles used for the convenience in explanation do not limit the rights according to the present disclosure, but may be applied to systems having similar technical backgrounds through the same or easy modifications thereof.

For the same reason, in the drawings, some constituent elements are exaggerated, omitted, or schematically illustrated. Further, the sizes of the respective constituent elements may not entirely reflect the actual sizes. Accordingly, the present disclosure is not limited to the relative sizes or gaps drawn in the accompanying drawings.

Further, a singular expression used in the present disclosure may include a plural expression unless specially described. Further, the term "and" described in the present disclosure should be understood that it calls and includes all possible combinations of one or more items of enumerated related items.

Further, the term "unit" or "module" described in the present disclosure means a unit to perform at least one function or operation, and may be implemented by hardware, software, or a combination of the hardware and software.

Hereinafter, the present disclosure will be described with reference to the accompanying drawings.

FIG. 1 is a view illustrating the configuration of a communication system according to an exemplary embodiment.

A communication system 10 according to an exemplary embodiment, as illustrated in FIG. 1, may include a first display device 101, a second display device 102, and a mobile device 103.

The first and second display devices 101 and 102 may process an image signal provided from an external image supply source (not illustrated) according to a preset image process so that the image signal can be displayed on a display 120, of each of the display devices 101 and 102, as a single image.

According to this exemplary embodiment, the first and second display devices 101 and 102 are implemented as TVs that display a broadcasting image based on broadcasting signal/broadcasting information/broadcasting data received from transmission equipment of a broadcasting station. However, the kind of images that can be displayed on the first and second display devices 101 and 102 is not limited to a broadcasting image. For example, the first and second display devices 101 and 102 may display moving images and still images based on signals/data received from various types of image supply sources, and images of applications, on-screen display (OSD), and user interfaces (UI) for various kinds of operation controls.

According to an exemplary embodiment, the first and second display devices 101 and 102 may be implemented by smart TVs. A smart TV can receive and display a broadcasting signal in real time, have a web browser function to search and display various kinds of content through the Internet simultaneously with the display of a broadcasting signal in real time, and provide convenient user environments for these operations. Further, in a case in which a smart TV includes an open type software platform to provide a bidirectional service to a user, the smart TV can provide various kinds of content, e.g., applications for providing predetermined services, to the user. Such applications are application programs that can provide various kinds of services, and may include, for example, applications for providing services of social networking services (SNS), finance, news, weather, maps, music, movies, games, and e-books.

Alternately, the first and second display devices 101 and 102 may be, for example, monitors connected to computer main body.

The mobile device 103 may be, for example, a digital device, such as a portable phone, such as a smart phone, a tablet, a portable media player, such as an MP3 player, a digital camera, or a camcorder. The mobile device and/or one or more of the display devices may include an image acquirer. such as a camera, including an image sensor 141. The camera may be provided in a predetermined position, for example, mounted on an upper portion of a front surface and/or a rear surface of the mobile device and/or one or more of the display devices. FIG. 1 illustrates that the mobile device is implemented by a smart phone, but the present disclosure is not limited thereto.

In the communication system according to this embodiment, devices can be connected to communicate with each other. Here, one of the first and second display devices 101 and 102 and the mobile device 103 may operate as a host, and the other thereof may operate as clients.

Figure 2:
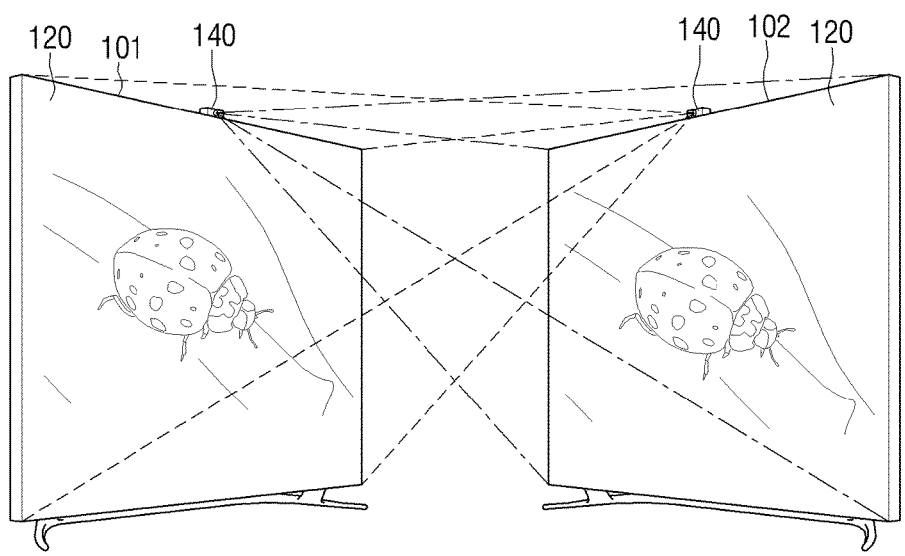
FIG. 2 is a view illustrating the configuration of a communication system according to another exemplary embodiment.

FIG. 2 is a view illustrating the configuration of a communication system according to another exemplary embodiment.

The communication system may include a first display device 101 and a second display device 102 as illustrated in FIG. 2.

The first and second display devices 101 and 102 may each include an image acquirer 140 including an image sensor 141 provided at predetermined positions (e.g., upper portions of front surfaces).

The first and second display devices 101 and 102 may be angled toward each other at a predetermined angle. For example, the first and second display devices 101 and 102 may face each other so that a camera included in the first display device 101 can acquire an image of the second display device 102, and vice-versa. Here, the predetermined angle may be equal to or larger than 0° and equal to or smaller than 180°.

As described above with reference to FIG. 1, the first and second display devices 101 and 102 may be TVs that display broadcasting images, smart TVs providing applications, or monitors connected to computer main bodies.

The communication system according to this embodiment includes devices that can be connected to communicate with each other. Here, one of the first and second display devices 101 and 102 may operate as a host, and the other thereof may operate as a client.

Hereinafter, a detailed configuration of an electronic device 100 according to an exemplary embodiment, which can be implemented by a display device or a mobile device, will be described with reference to FIG. 3.

Figure 3:
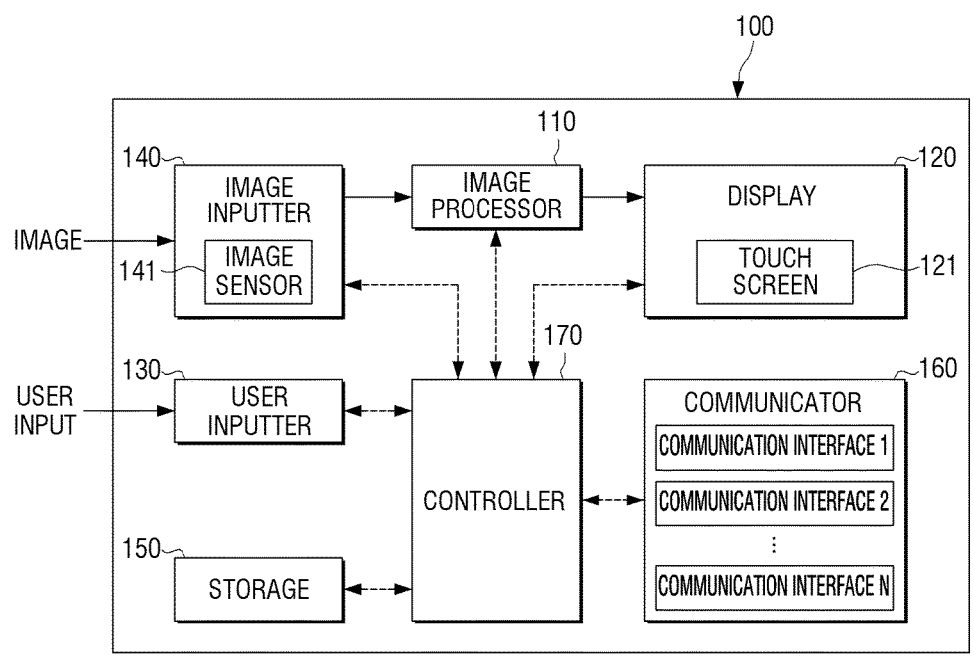
FIG. 3 is a block diagram illustrating the configuration of an electronic device according to an exemplary embodiment.

FIG. 3 is a block diagram illustrating a configuration of an electronic device 100 according to an exemplary embodiment, and the configuration of the electronic device 100 illustrated in FIG. 3 can be applied to one or more of the first and second display devices 101 and 102 and the mobile device 103 of FIGS. 1 and 2.

As illustrated in FIG. 3, the electronic device 100 may include an image processor 110 that processes n image signal received from an external source, a display 120 that displays the image signal processed by the image processor 110 as an image, a user inputter 130 that receives a user's input, an image acquirer 140 that acquires an image, a storage 150 in which various kinds of data are stored, a communicator 160 that performs wired and/or wireless communication with one or more external devices, and a controller 170 that controls the electronic device 100.

The image processor 110 may perform various preset image processes with respect to the image signal. The image processor 110 may output the image signal that is processed by the processes to the display 120 to display the image on the display 120.

The image processor 110 may include an image receiver (not illustrated) that receives the image signal from an external source. The image processor 110 may be implemented in any of various manners to correspond to the standard of the received image signal or implementation type of the electronic device 100. For example, the image processor 110 may wirelessly receive a radio frequency (RF) signal that is transmitted from a broadcasting station (not illustrated) or may receive, by wire, an image signal according to composite video, component video, super video, Syndicat des Constructeurs d'Appareils Radiorécepteurs et Téléviseurs (SCART), or high definition multimedia interface (HDMI) standards. If the image signal is a broadcast signal, the image processor 110 may include a tuner that tunes to a channel of the broadcast signal.

The image signal may be input from an external device, and for example, the image signal may be input from an external device, such as a personal computer (PC), an audio/visual (AV) device, a smart phone, or a smart pad. The image signal may comprise data that is received through a network such as the Internet. In this case, the electronic device 100 may perform network communication through the communicator 160. The image signal may comprise data that is stored in a nonvolatile storage 150, such as a flash memory or a hard disk. The storage 150 may be provided within the electronic device 100 or externally, and in the case in which the storage 150 is provided externally, the storage 150 may further include a connector (not illustrated) to which the storage 150 is connected.

The kind of image processes performed by the image processor 110 is not limited, and may include, for example, at least one of decoding that corresponds to various image formats, deinterleaving, frame refresh rate conversion, scaling, noise reduction for improving the image quality, detail enhancement, and line scanning. The image processor may be implemented by a group of an individual configuration that can independently perform respective processes or by a system-on-chip (SoC) that integrates various functions.

The display 120 displays an image based on the image signal processed by the image processor 110. The implementation method of the display 1120 is not limited, and may be implemented by, for example, any of various display types of displays including liquid crystal displays, plasma displays, light-emitting diode (LED) displays, organic light-emitting diode (OLED) displays, surface-conduction electron-emitter displays, carbon nano-tube displays, and nano-crystal displays.

The display 120 may additionally include an additional configuration according the implementation type. For example, if the display 120 is a liquid crystal display, the display 120 may include a liquid crystal display panel (not illustrated), a backlight unit (not illustrated) that supplies light to the liquid crystal display panel, and a panel driving board (not illustrated) that drives the panel (not illustrated).

The display 120 may include a touch screen 121 that receives a user's touch input. The touch screen 121 may be, for example, a resistive type, a capacitive type, an infrared type, or an acoustic wave type.

The touch screen 121 may display objects (e.g., menu, text, image, video, figure, icon, and shortcut icon) that include menu items of the display device 100. A user may touch an object displayed on the touch screen 121 using a user's body (e.g., finger) or a separate pointing device, such as stylus, to make a user input.

The touch screen 121 may provide, to a user, a graphic user interface (GUI) that corresponds to any of various services (e.g., call, data transmission, broadcasting, photographing, moving image, and application). The touch screen 121 may transmit, to the controller 170, an analog signal that corresponds to a single touch or multi-touch input through the GUI.

The touch is not limited to a contact between the touch screen 121 and the user's body or a touchable pointing device, but further includes non-contact (e.g., hovering at which a detectable gap between the touch screen 121 and the user's body or the pointing device is equal to or smaller than 30 mm). It could be easily understood to those of ordinary skill in the art that the non-contact gap that can be detected on the touch screen 121 may be changed depending on the performance or structure of the electronic device 100.

The touch input may include at least one of drag, flick, drag and drop, tap, and long tap.

Communication interface information that is supported by the communicator 160 may be displayed on the display 120. The controller 170 may request the communication interface information from the communicator 160 that is stored in the storage 150 and may control the display 120 to display the communication interface information.

The user inputter 130 may transfer any of various preset control commands or unlimited information to the controller 170 through the user's operation and input.

The user inputter 130 may include a keypad (or input panel) (not illustrated) including buttons, such as numeral keys and menu keys provided on a main body of the electronic device 100, a remote controller that generates command/data/information/signal that are preset to remotely control the TV to transmit the generated command/data/information/signal to the electronic device 100, and an input device, such as a keyboard or a mouse, that is separately spaced apart from the main body.

The input device is an external device that can perform wireless communications with the main body of the electronic device 100, and the wireless communications may include infrared communication, radio frequency (RF) communication, and wireless local area network (LAN). The input device may be operated by the user to transmit preset commands to the electronic device 100.

The keypad may include one or more of a physical keypad formed on the front surface and/or the side surface of the electronic device 100, a virtual keypad displayed on the touch screen 121, and a physical keypad that can be wirelessly connected. It would be understood by those of ordinary skill in the art that the physical keypad that is formed on the front surface and/or the side surface of the electronic device 100 may be excluded depending on the performance or the structure of the electronic device 100.

The user inputter 130 may further include a touch sensor (not illustrated) provided on a remote controller to sense a user's touch, and a motion sensor (not illustrated) sensing user's self-motion.

The user inputter 130 may receive, from the user, a communication connection request for communication with the other device, and may include a dedicated button that is provided to correspond to the communication connection request for communication with the other device.

The image acquirer 140 may be a camera that captures an external image. In this case, the camera may be installed at a predetermined position, e.g., an upper portion, of the electronic device 100, but the installation position thereof is not limited thereto. According to circumstances, the camera may be installed outside of the main body, separated from the main body of the electronic device 100.

The image acquirer 140 may include a lens (not illustrated), which transmits an image, and an image sensor 141 that senses the image transmitted by the lens. The image sensor 141 may be implemented by a charge-coupled device/complementary metal-oxide-semiconductor (CCD/CMOS) image sensor.

In a case in which the electronic device 100 is implemented by a mobile device, such as a smart phone or a tablet, the image acquirer 140 may include at least one of a first camera on a front surface and a second camera on a rear surface, which capture a till image or a moving image under the control of the controller 170. The image acquirer 140 may include one or both of the first camera and the second camera. One or more of the first camera and the second camera may further include an auxiliary light source (e.g., a flash) that provides light required for photographing.

The image acquirer 140 may read communication interface information that is supported by the other device through capturing of an image that is displayed on the display of the other device.

The image input through the image acquirer 140 may be processed by the image processor 110. The controller 170 may extract the communication interface information of the other device, to be described later, from the image processed by the image processor 110. The controller 170 may establish a communication connection with the other device using the extracted communication interface information. In the storage 150, unlimited data may be stored under the control of the controller 170. The storage 150 may include one or more of a nonvolatile memory, a volatile memory, a flash memory, a hard disk drive (HDD), or a solid state drive (SSD). The storage 150 may be accessed by the controller 170, and data read/write/correction/deletion/update processes may be performed by the controller 170.

The data stored in the storage 150 may include an operating system for driving the electronic device 100, various applications that are executable on the operating system, image data, and additional data.

Specifically, in the storage 150, signals or data that are input/output to correspond to the operations of respective constituent elements may be stored under the control of the controller 170. In the storage 150, graphic user interfaces (GUIs) related to control programs for controlling the electronic device 100 and applications that are provided by a manufacturer or downloaded from an outside, images for providing the GUIs, user information, documents, databases, and related data may be stored.

In the storage 150, various kinds of information, including coordinate information for sensing a user's input on the touch screen 121, may be further stored. For example, if a user's touch on the touch screen 121 is sensed, the controller 170 may identify the kind of the sensed touch input using the information pre-stored in the storage 150, and may calculate coordinate information (X and Y coordinates) that corresponds to the touch position to transfer the calculated coordinate information to the image processor 110. Further, an image that corresponds to the identified kind of touch input and the touch position may be displayed on the display 120 through the image processor 110.

Communication interface information (or network interface information) that is supported by the communicator 160 may be further stored in the storage 150. Here, the storage 150 may be implemented so that the communication interface information supported by the communicator 160 is pre-stored therein, or usable communication interfaces are inquired or searched in response to a user's connection request between devices and information that corresponds to the result of the inquiry is stored therein.

The term "storage" may refer to a ROM (not illustrated), a RAM (not illustrated), which may be provided in the storage 150 or the controller 170, or a memory card (not illustrated) (e.g., micro secure digital (SD) card, or memory stick) which is mounted in the electronic device 100.

The communicator 160 may perform communication with the other device. The communicator 160 may support at least one of communication interfaces 1 to N of Wi-Fi, Bluetooth, RF, Zigbee, wireless LAN, infrared communication, ultra wideband (UWB), and near field communication (NFC).

If the electronic device 100 is a portable phone, such as a smart phone, the communicator 160 may further include a mobile communicator (not illustrated). The mobile communicator may transmit/receive wireless signals for voice call, video call, small message service (SMS), multimedia message service (MMS), and data communication with a portable phone, a smart phone, or a tablet, which has a phone number that is connectable to the electronic device 100. The communicator 160 may further include at least one wired communication interface.

The communicator 160 may be built in the main body of the electronic device 100 or may be implemented in the form of a dongle or module to be detachably attached to a connector (not illustrated) of the electronic device 100.

The controller 170 may perform a control operation with respect to various constituent elements of the electronic device 100. For example, the controller 170 may control the whole operation of the electronic device 100 in a manner that the controller 170 performs proceeding of an image process that is performed by the image processor 110, controls an operation that corresponds to a command from the user inputter 130, senses of an operation position that corresponds to a user's touch on the touch screen 121 and sets a virtual point (X and Y coordinates) that corresponds to the user's touch, and an operation that corresponds to the user's touch. The controller 170 may be software coupled to a CPU.

The controller 170 may control the whole operation of the electronic device 100 and signal flow between the internal constituent elements 110 to 160 of the electronic device 100, and perform a function of processing data. The controller 170 may control power supply from a power supply (not illustrated) to the internal constituent elements 110 to 160. Further, if a user's input is performed, or if conditions which have been set and stored are satisfied, the controller 170 may execute the operating system (OS) and various applications stored in the storage 150.

The controller 170 of the electronic device 100 may control the display 120 to display the communication interface information supported by the communicator 160 in response to the user's operation for communication connection with the other device. The communication interface information that is supported by the communicator 160 may be pre-stored in the storage 150 and may be displayed on the display 120 in any various formats, such as a text, a quick response (QR) code, and a barcode.

The controller 170 may activate the image acquirer 140 and may receive the communication interface information of the other device that is sensed through the image sensor 141 in response to the user's operation for the communication connection with the other device. Further, the controller 170 may analyze the input communication interface information of the other device, compare the analyzed communication interface information of the other device with communication interface information supported by the corresponding device 100, determine the communication interface to be used for the communication connection, and set the communication connection with the other device based on the determined communication interface.

The controller 170 may set the communication connection through the communication interface that is commonly supported by the electronic device 100 and the other device. If a plurality of communication interfaces are commonly supported by the two devices, the controller 170 may select an optimum interface, and for example, may select any one of the communication interfaces as the optimum communication interface according to at least one of a system environment, a preset priority, and user's setting.

During the communication connection, any one of the plurality of electronic devices 100 of the communication system may operate as a host, and the other thereof may operate as a client.

Hereinafter, a method for controlling a connection between electronic devices 100 in a communication system of FIG. 1 or 2 will be described with reference to FIGS. 4 to 6.

Figure 4:
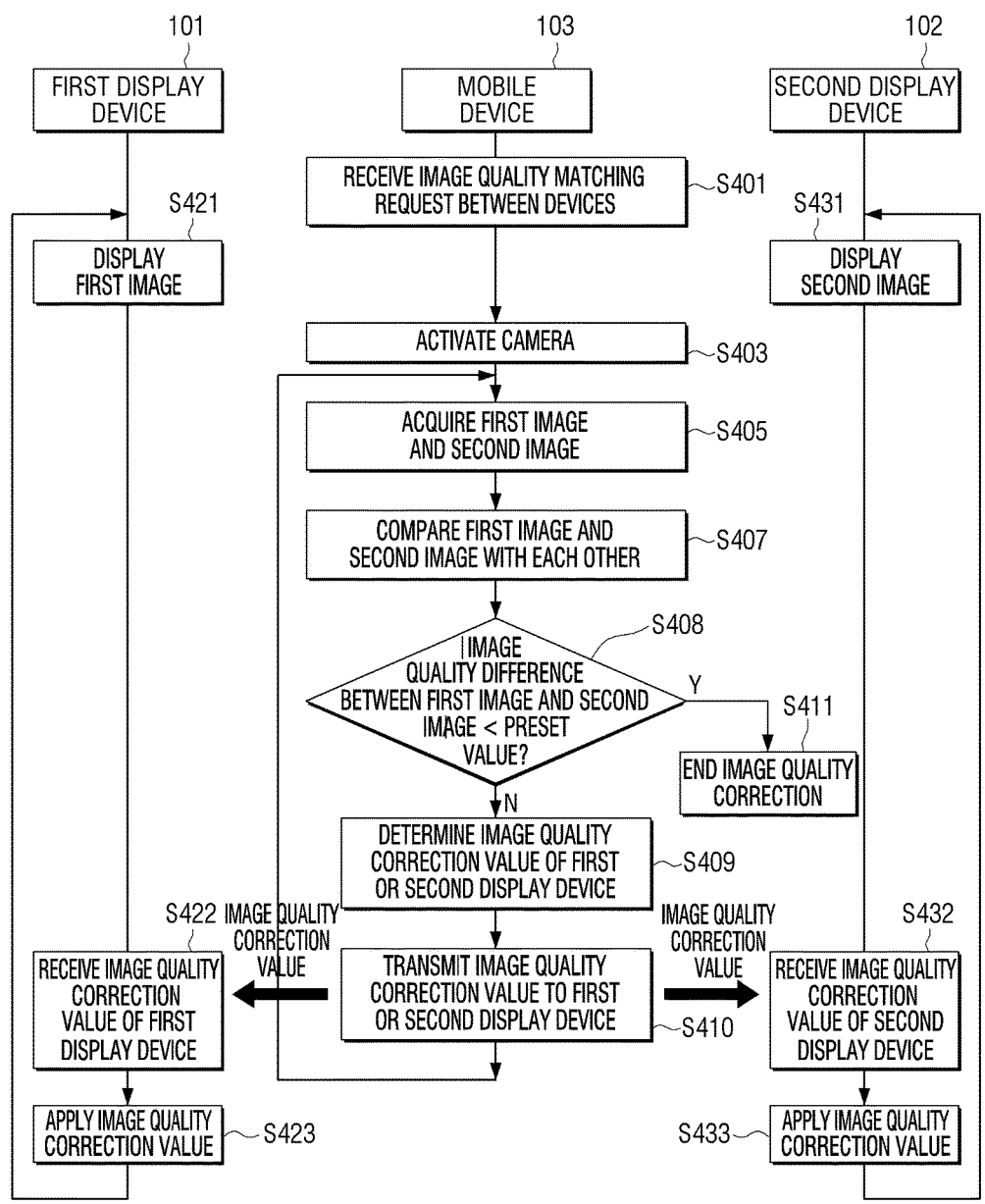
FIG. 4 is a flowchart illustrating a connection control method of the communication system of FIG. 1 according to an exemplary embodiment.

FIG. 4 is a flowchart illustrating a connection control method of a communication system of FIG. 1 according to an exemplary embodiment.

Referring to FIG. 4, a mobile device 103 may receive a request for image quality matching between first and second display devices 101 and 102 from a user (S401). For example, the user may execute an application for image quality matching through operation of a user inputter 130 or a touch screen 121 of the mobile device 103, and may request matching of image qualities between the first and second display devices 101 and 102 using a menu that is provided by an application.

In response to the user's image quality matching request (S401), the controller 170 of the mobile device 103 may activate the image acquirer 140, i.e., camera, of the mobile device 103 (S403).

In this case, the display 120 of the first display device 101 may display a first image (S411), and the display 120 of the second display device 102 may display a second image (S431). Here, the first image and the second image may be the same image. For example, the first image and the second image may be the same image that is provided from the same source.

If the camera is activated (S403), the image acquirer 140 of the mobile device 103 may acquire the first image that is displayed on the first display device 101 and the second image that is displayed on the second display device 102 (S405). Acquiring of the first image and the second image through the image acquirer 140 of the mobile device 101 may include capturing and storing of the first image and the second image in the storage 150 of the mobile device 103 through the user's operation, or temporarily storing of the first image and the second image input through the image acquirer 140 and displaying of the stored images on the display 120 of the mobile device 103 even if there is not user's capturing operation.

If the first image and the second image are acquired (S405), the controller 170 of the mobile device 103 may compare the first image and the second image with each other (S407). If it is determined that a difference in image quality between the first image and the second image is equal to or lower than a predetermined value as the result of the comparison (S408), the controller 170 of the mobile device 103 may end the image quality correction process of the first display device 101 or the second display device 102 (S411). In contrast, if the difference in image quality between the first image and the second image is higher than the predetermined value (S408), the controller 170 of the mobile device 103 may set the image quality correction value of the first display device 101 or the second display device 102 (S409).

The controller 170 of the mobile device 103 may extract a region of the display 120 of the first display device 101 from the first image, and may extract a region of the display 120 of the second display device 102 from the second image. In this case, the extraction method of the regions of the displays 120 of the first and second display devices 101 and 102 may be determined in a manner that the controller 170 of the mobile device 103 recognizes frames of the first and second display devices 101 and 102 from the first image and the second image and determines central region of the frame as the region of the display 120, or the controller 170 recognizes the brightnesses of the first image and the second image and determines a relatively bright region as the region of the display 120. Hereinafter, explanation will be made under the assumption that the first image comprises the portion of the display 120 of the first display device 101 and the second image comprises the portion of the display 120 of the second display region 102.

The controller 170 of the mobile device 103 may acquire pixel values in predetermined positions of the regions of the first image and the second image.

Figure 7:
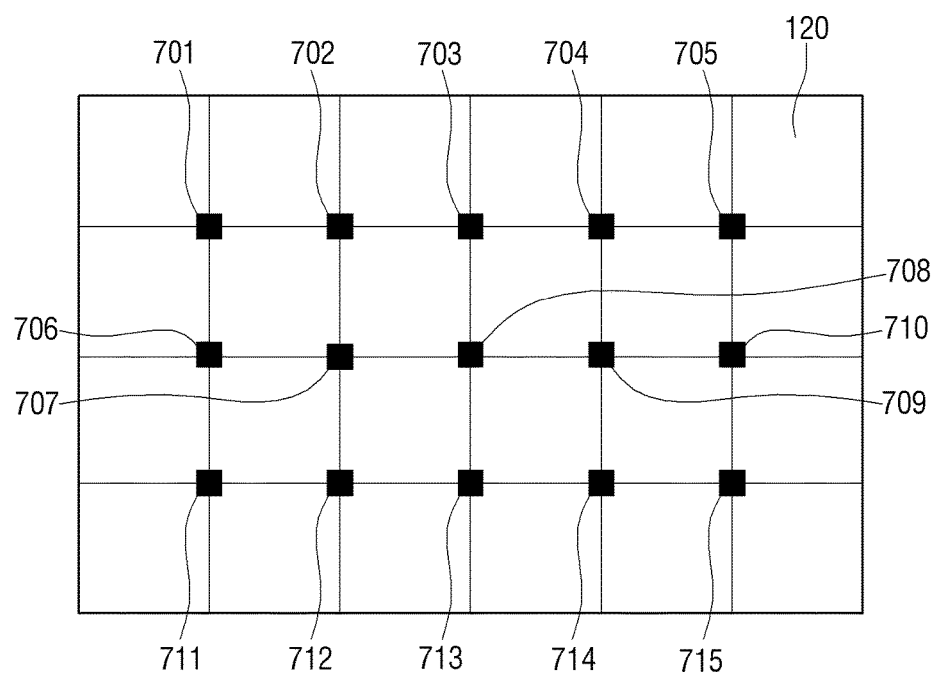
FIG. 7 is a view illustrating positions of pixel values acquired from a first image and a second image through a mobile device.

FIG. 7 is a view illustrating positions of pixel values acquired from a first image and a second image through a mobile device 103.

Referring to FIG. 7, the controller 170 of the mobile device 103 may acquire the pixel values in positions in which the first image and the second image are respectively divided into equal parts at predetermined intervals in horizontal and vertical directions. The divided parts in the horizontal and vertical directions cross each other. In FIG. 7, the controller 170 of the mobile device 103 may acquire pixel values 701 to 715 in positions in which the first image and the second image are respectively divided into three and four equal parts in the horizontal and vertical directions, respectively, and the divided parts in the horizontal and vertical directions cross each other. In other words, the portion of the display of each of the first and second display devices is divided into a 3×4 matrix, and the pixel values are values at intersections of the sections of the matrix.

In the case where the pixel values 701 to 715 are acquired from the first image and the second image, the controller 170 of the mobile device 103 may obtain average values of red (R), green (G), and blue (B) colors of the pixel values acquired from the first image and average values of R, G, and B colors of the pixel values acquired from the second image. Here, the average value of the R, G, and B colors may be any one of "0" to "255" according to an RGB color code. The controller 170 of the mobile device 103 may calculate a difference between average values through comparison of the average value of the R, G, and B colors acquired from the first image with the average value of the R, G, and B colors acquired from the second image. Here, it is merely exemplary that the controller 170 of the mobile device 103 compares the average values of the R, G, and B colors, and the controller 170 of the mobile device 103 may use a median of the R, G, and B colors or a mode of the R, G, and B colors. The controller 170 of the mobile device 103 may determine the image quality correction value of the first display device 101 or the second display device 102 based on the difference in average value between the R, G, and B colors of the first image and the R, G, and B colors of the second image. It is described herein that the controller 170 of the mobile device 103 determines the image quality correction value based on the R, G, and B color values of the pixel values of the first image. However, it will be apparent to those of skill in the art that the image quality correction value can be determined using any of various kinds of pixel information, such as brightness and luminance.

FIGS. 8A to 8D are diagrams illustrating tables including image quality correction values of one of a first display device 101 and a second display device 102.

FIG. 8A shows a table 810 in which image quality correction values of the first display device 101 are shown.

Referring to FIG. 8A, the table 810 includes an R color average value difference field 811 and an R color image quality correction value field 812 for the first display device 101. The field 811 indicates a value obtained by subtracting the average value of the R color of the second image from the average value of the R color of the first image, and the field 812 indicates the image quality correction value of the R color of the first display device 101. Here, it may be assumed that image quality correction values of R color of the first display device 101 are, for example, in the range of "0" to "100", and an initial offset value of R color is "50". In this case, the range of the image quality correction values of R, G, and B colors may be equal to the range that can be adjusted by a user using a menu key provided on the main body of the electronic device 100 or a bottom of a remote controller.

In FIG. 8A, the image quality correction value field 812 that corresponds to the R color average value difference field 811 may have different values depending on the average value difference of the R color.

Referring to a field 814 of the table 810, if the value that is obtained by subtracting the average value of the R color of the second image from the average value of the R color of the first image is equal to or smaller than "−50" as the result of comparing the first image and the second image with each other, the image quality correction value of the R color of the first display device 101 may be determined as "+20". Further, referring to a field 815 of the table 810, if the value that is obtained by subtracting the average value of the R color of the second image from the average value of the R color of the first image is larger than "−50" and smaller than "−40", the image quality correction value of the R color of the first display device 101 may be determined as "+16". In a similar manner, even in fields 816 to 824 of the table 810, the image quality correction value of the R color of the first display device 101 may be determined according to the difference between average values of the R colors. On the other hand, like the field 819 of the table 810, if the difference between the average values of R colors of the first image and the second image is larger than "−10" and is smaller than "+10", the image quality correction of the R color of the first display device 101 may be ended.

FIG. 8B shows a table 830 in which image quality correction values of the first display device 101 and the second display device 102 are shown.

Referring to FIG. 8B, the table 830 includes an R color average value difference field 831, an R color image quality correction value field 832 of the first display device 101, and an R color image quality correction value field 833 of the second display device 102. The field 831 indicates a value obtained by subtracting the average value of the R color of the second image from the average value of the R color of the first image, and the field 832 indicates the image quality correction value of the R color of the first display device 101. The field 833 indicates the image quality correction value of the R color of the second display device 102. Here, it may be assumed that image quality correction values of R colors of the first and second display device 101 and 102 are, for example, in the range of "0" to "100", and an initial offset value of R color is "50".

In FIG. 8B, the image quality correction value fields 832 and 833 that correspond to the R color average value difference field 831 may have different values depending on the average value difference of the R color.

Referring to a field 834 of the table 830, if the value that is obtained by subtracting the average value of the R color of the second image from the average value of the R color of the first image is equal to or smaller than "−50" as the result of comparing the first image and the second image with each other, the image quality correction value of the R color of the first display device 101 may be determined as "+10", and the image quality correction value of the R color of the second display device 102 may be determined as "−10". Referring to a field 835 of the table 830, if the value that is obtained by subtracting the average value of the R color of the second image from the average value of the R color of the first image is larger than "−50" and smaller than "−40", the image quality correction value of the R color of the first display device 101 may be determined as "+8" and the image quality correction value of the R color of the second display device 102 may be determined as "−8". In a similar manner, even in fields 836 to 844 of the table 830, the image quality correction values of the R colors of the first and second display devices 101 and 102 may be determined according to the difference between average values of the R colors. On the other hand, like the field 839 of the table 830, if the difference between the average values of R colors of the first image and the second image is larger than "−10" and is smaller than "+10", the image quality correction of the R colors of the first and second display devices 101 and 102 may be ended.

FIG. 8C shows a table 850 in which image quality correction values of the first display device 101 are shown.

Referring to FIG. 8C, the table 850 includes an R color average value difference field 851 and an R color image quality correction value field 852 of the first display device 101. The field 851 indicates a value obtained by subtracting the average value of the R color of the second image from the average value of the R color of the first image, and the field 852 indicates the image quality correction value of the R color of the first display device 101. Here, it may be assumed that image quality correction values of R color of the first display device 101 are, for example, in the range of "0" to "100", and an initial offset value of R color is "50".

Referring to a field 854 of the table 850, if the value that is obtained by subtracting the average value of the R color of the second image from the average value of the R color of the first image is equal to or smaller than "−10" as the result of comparing the first image and the second image with each other, the image quality correction value of the R color of the first display device 101 may be determined as "+4". Further, referring to a field 855 of the table 850, if the value that is obtained by subtracting the average value of the R color of the second image from the average value of the R color of the first image is equal to or larger than "+10", the image quality correction value of the R color of the first display device 101 may be determined as "+4". On the other hand, like the field 856 of the table 850, if the difference between the average values of R colors of the first image and the second image is larger than "−10" and is smaller than "+10", the image quality correction of the R color of the first display device 101 may be ended.

FIG. 8D shows a table 870 in which image quality correction values of the first and second display devices 101 and 102 are shown.

Referring to FIG. 8D, the table 870 includes an R color average value difference field 871, an R color image quality correction value field 872 of the first display device 101, and an R color image quality correction value field 873 of the second display device 102. The field 871 indicates a value obtained by subtracting the average value of the R color of the second image from the average value of the R color of the first image, and the field 872 indicates the image quality correction value of the R color of the first display device 101. The field 873 indicates the image quality correction value of the R color of the second display device 102. Here, it may be assumed that image quality correction values of R colors of the first and second display device 101 and 102 are, for example, in the range of "0" to "100", and an initial offset value of R color is "50".

In FIG. 8D, the image quality correction value fields 872 and 873 that correspond to the R color average value difference field 871 may have different values depending on the average value difference of the R color.

Referring to a field 874 of the table 870, if the value that is obtained by subtracting the average value of the R color of the second image from the average value of the R color of the first image is equal to or smaller than "−10" as the result of comparing the first image and the second image with each other, the image quality correction value of the R color of the first display device 101 may be determined as "+2", and the image quality correction value of the R color of the second display device 102 may be determined as "−2". Further, referring to a field 875 of the table 870, if the value that is obtained by subtracting the average value of the R color of the second image from the average value of the R color of the first image is equal to or larger than "+10", the image quality correction value of the R color of the first display device 101 may be determined as "+2" and the image quality correction value of the R color of the second display device 102 may be determined as "+2". On the other hand, like the field 876 of the table 870, if the difference between the average values of R colors of the first image and the second image is larger than "−10" and is smaller than "+10", the image quality correction of the R colors of the first and second display devices 101 and 102 may be ended.

If the image quality correction value of the first display device 101 or the second display device 102 is determined (S409), the communicator 160 of the mobile device 103 may transmit the image quality correction value of the first display device 101 to the first display device 101 (S410). Further, the communicator 160 of the mobile device 103 may transmit the image quality correction value of the second display device 102 to the second display device 102 (S410). Further, the communicator 160 of the mobile device 103 may transmit the image quality correction value of the first display device 101 to the first display device 101, and may transmit the image quality correction value of the second display device 102 to the second display device 102 (S410).

The communicator 160 of the first display device 101 may receive the image quality correction value of the first display device 101 (S422). The controller 170 of the first display device 101 may adjust the image quality of the display 120 of the first display device 101 through applying of the received image quality correction value (S423). As a result of the image quality adjustment, the controller 170 of the first display device 101 may display the first image to which the image quality correction value has been applied through the display 120 of the first display device 101 (S421).

In another exemplary embodiment, the communicator 160 of the second display device 102 may receive the image quality correction value of the second display device 102 (S432). The controller 170 of the second display device 102 may adjust the image quality of the display 120 of the second display device 102 through applying of the received image quality correction value (S433). As a result of the image quality adjustment, the controller 170 of the second display device 102 may display the second image to which the image quality correction value has been applied through the display 120 of the second display device 102 (S431).

In still another exemplary embodiment, both the first display device 101 and the second display device 102 may receive the image quality correction values (S422 and S432). In this case, the controller 170 of the first display device 101 and the controller 170 of the second display device 102 may adjust the image qualities of the displays 120 of the first display device 101 and the second display device 102 through applying of the received image quality correction values (S423 and S433). As a result of the image quality adjustment, the first image to which the image quality correction value has been applied may be displayed through the display 120 of the first display device 101 (S421), and the second image to which the image quality correction value has been applied may be displayed through the display 120 of the second display device 102 (S431).

In the case in which the first display device 101 and the second display device 102 display again the first image and the second image to which the image quality correction values have been applied (S421 and S431), the camera of the mobile device 103 may acquire again the first image and the second image to which the image quality correction values have been applied (S405). Further, the controller 170 of the mobile device 103 may repeat S405 to S410 until the difference between the first image and the second image to which the image quality correction values have been applied becomes equal to or smaller than a predetermined value. That is, the controller 170 of the mobile device 103 may repeat S405 to S410 so that the image quality of the first image that is displayed on the first display device 101 becomes equal to or similar to the image quality of the second image that is displayed on the second display device 102. Here, a case where the image quality of the first image is equal to the image quality of the second image may mean a case where an average value of the acquired pixel values of the first image to which the image quality correction value has been applied is equal to an average value of the acquired pixel values of the second image to which the image quality correction value has been applied. Further, a case in which the image quality of the first image is similar to the image quality of the second image may means a case where the difference between the average value of the acquired pixel values of the first image to which the image quality correction value has been applied and the average value of the acquired pixel values of the second image to which the image quality correction value has been applied is equal to or smaller than a predetermined value.

If the difference between the first image and the second image is equal to or smaller than the predetermined value, the controller 170 of the mobile device 103 may end the image quality correction of the first display device 101 and the second display device 102. The controller 170 of the mobile device 103 may notify a user, through the display, that the image qualities of the images of the first display device 101 and the second display device 102 are matched.

Figure 5:
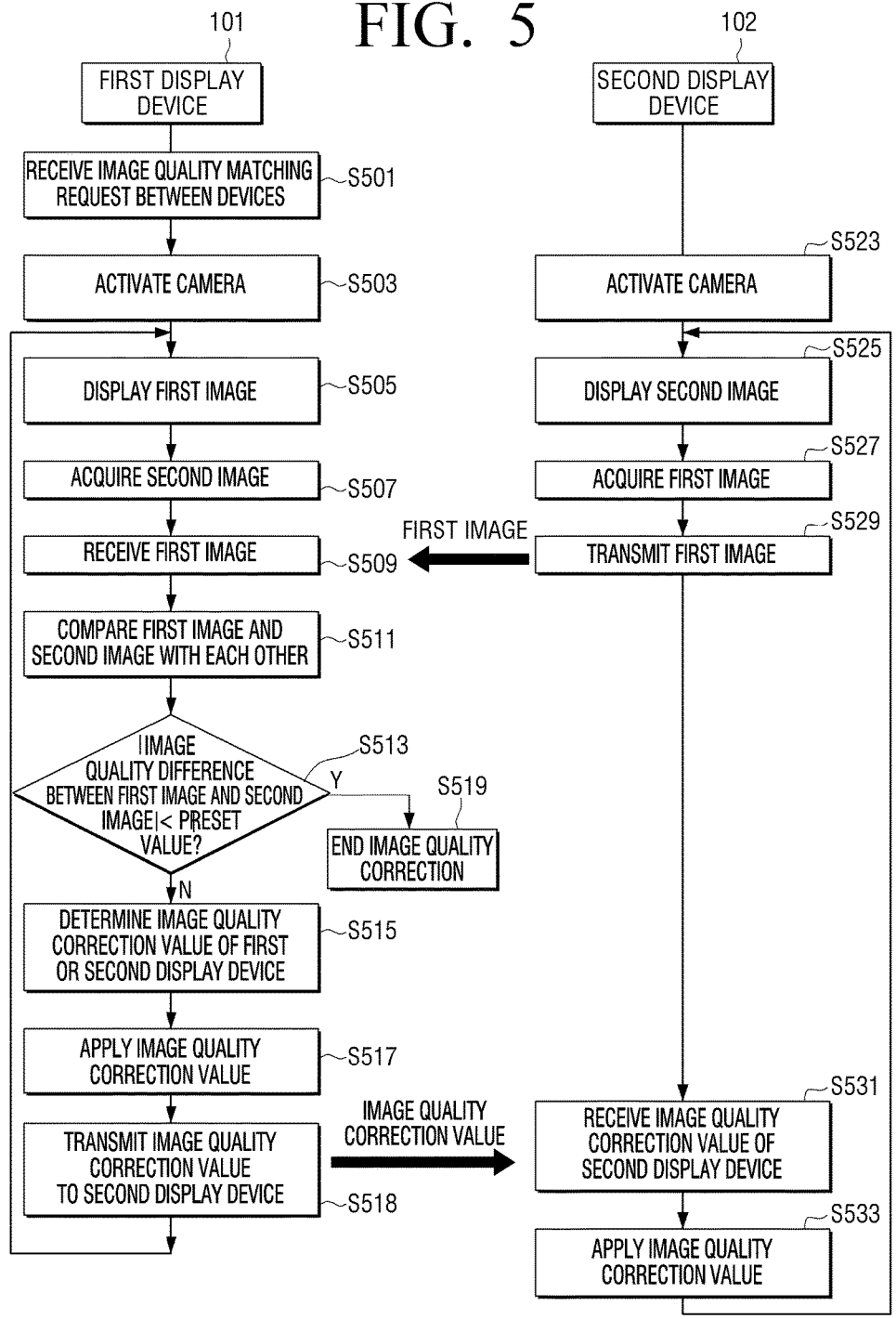
FIG. 5 is a flowchart illustrating a connection control method of the communication system of FIG. 2 according to an exemplary embodiment.

FIG. 5 is a flowchart illustrating a connection control method of a communication system of FIG. 2 according to an exemplary embodiment.

Referring to FIG. 5, a first display device 101 may receive, from a user, a request for image quality matching between first and second display devices 101 and 102 (S501). For example, the user may execute an OSD menu of the first display device 101 through operation of a user inputter 130 of the first display device 101, and may request matching of image qualities between the first and second display devices 101 and 102 through the OSD menu.

In response to the user's image quality matching request (S501), the controller 170 of the first display device 101 may activate the image acquirer 140, i.e., camera, of the first display device 101 (S503). Further, the controller 170 of the first display device 101 may provide a signal, to the second display device 102, for requesting activation of the image acquirer 140, i.e., the camera, of the second display device 102. In response to the camera activation signal from the first display device 101, the controller 170 of the second display device 102 may activate the image acquirer 140, i.e., the camera, of the second display device 102 (S523).

In the case in which the cameras of the first and second display devices 101 and 102 are activated (S503 and S523), the first display device 101 may display the first image through the display 120 of the first display device 101 (S505), and the second display device 102 may display the second image through the display 120 of the second display device 102 (S525). In this case, the first and second display devices 101 and 102 might display the first image and the second image before the cameras of the first and second display devices 101 and 102 are activated. The first image and the second image may be the same image. For example, the first image and the second image may be the same image provided from the same source.

If the first image and the second image are displayed (S505 and S525), the image acquirer 140 of the first display device 101 may acquire the second image that is displayed on the second display device 102 (S507), and the image acquirer 140 of the second display device 102 may acquire the first image that is displayed on the first display device 102 (S527).

In the case in which the first and second display devices 101 and 102 acquire the first image and the second image (S507 and S527), the communicator 160 of the second display device 102 may transmit the acquired first image to the first display device (S529). The communicator 160 of the first display device 101 may receive the first image (S509).

The first display device 101 may compare the received first image and the acquired second image (S507) with each other (S511). If it is determined that a difference in image quality between the first image and the second image is equal to or lower than a predetermined value as the result of the comparison (S513), the controller 170 of the first display device 101 may end the image quality correction process of the first display device 101 or the second display device 102 (S519). In contrast, if the difference in image quality between the first image and the second image is higher than the predetermined value (S513), the controller 170 of the first display device 101 may determine the image quality correction value of one or both of the first display device 101 and the second display device 102 (S515). The controller 170 of the first display device 101 may acquire pixel values from the first image and the second image as described above, and may determine the image quality correction values of one or both of the first display device 101 and the second display device 102 with reference to a table depending on the difference between average values of the pixel values of the first image and the second image (S515). If the pixel values are acquired from the first image and the second image, the controller 170 of the first display device 101 may acquire the pixel values in consideration of the resolution of the first image and the second image. For example, if the resolution of the first image is higher than the resolution of the second image, the controller 170 of the first display device 101 may acquire the pixel values of the second image of which the number is larger than the number of pixel values of the second image when acquiring the pixel values in positions in which the first image and the second image are respectively divided into equal parts at a predetermined interval in horizontal and vertical directions and the divided parts in the horizontal and vertical directions cross each other. Further, the controller 170 of the first display device may compare average values of the pixels of the first image and the second image with each other.

If the image quality correction value of the first display device 101 is determined (S515), the controller 170 of the first display device 101 may adjust the image quality of the display 120 of the first display device 101 through application of the determined image quality correction value (S517). As the result of the image quality adjustment, the controller 170 of the first display device 101 may display the first image to which the image quality correction value has been applied through the display 120 of the first display device 101 (S505). If the image quality correction value of the second display device 102 is determined (S515), the communicator 160 of the first display device 101 may transmit the image quality correction value of the second display device 102 to the second display device 102 (S518).

The communicator 160 of the second display device 102 may receive the image quality correction value of the second display device 102 (S531). The controller 170 of the second display device 102 may adjust the image quality of the display 120 of the second display device 102 through application of the received image quality correction value (S533). As the result of the image quality adjustment, the controller 170 of the second display device 102 may display the second image to which the image quality correction value has been applied through the display 120 of the second display device 102 (S525).

In the case in which the first display device 101 and the second display device 102 again display the first image and the second image to which the image quality correction values have been applied (S505 and S525), the camera of the first display device 101 may again acquire the second image to which the image quality correction value has been applied, and the communicator 160 of the first display device 101 may receive again the first image to which the image quality correction value has been applied from the second display device 102. Further, the controller 170 of the first display device 101 may repeat S505 to S518 until the difference between the first image and the second image to which the image quality correction values have been applied becomes equal to or smaller than a predetermined value. That is, the controller 170 of the first display device 101 may repeat S505 to S518 so that the image quality of the first image that is displayed on the first display device 101 becomes equal to or similar to the image quality of the second image that is displayed on the second display device 102.

If the difference between the first image and the second image is equal to or smaller than the predetermined value, the controller 170 of the first display device 101 may end the image quality correction of the first display device 101 and the second display device 102. The controller 170 of the first display device 101 may notify a user, through the display 120, that the image qualities of the images of the first display device 101 and the second display device 102 are matched.

Figure 6:
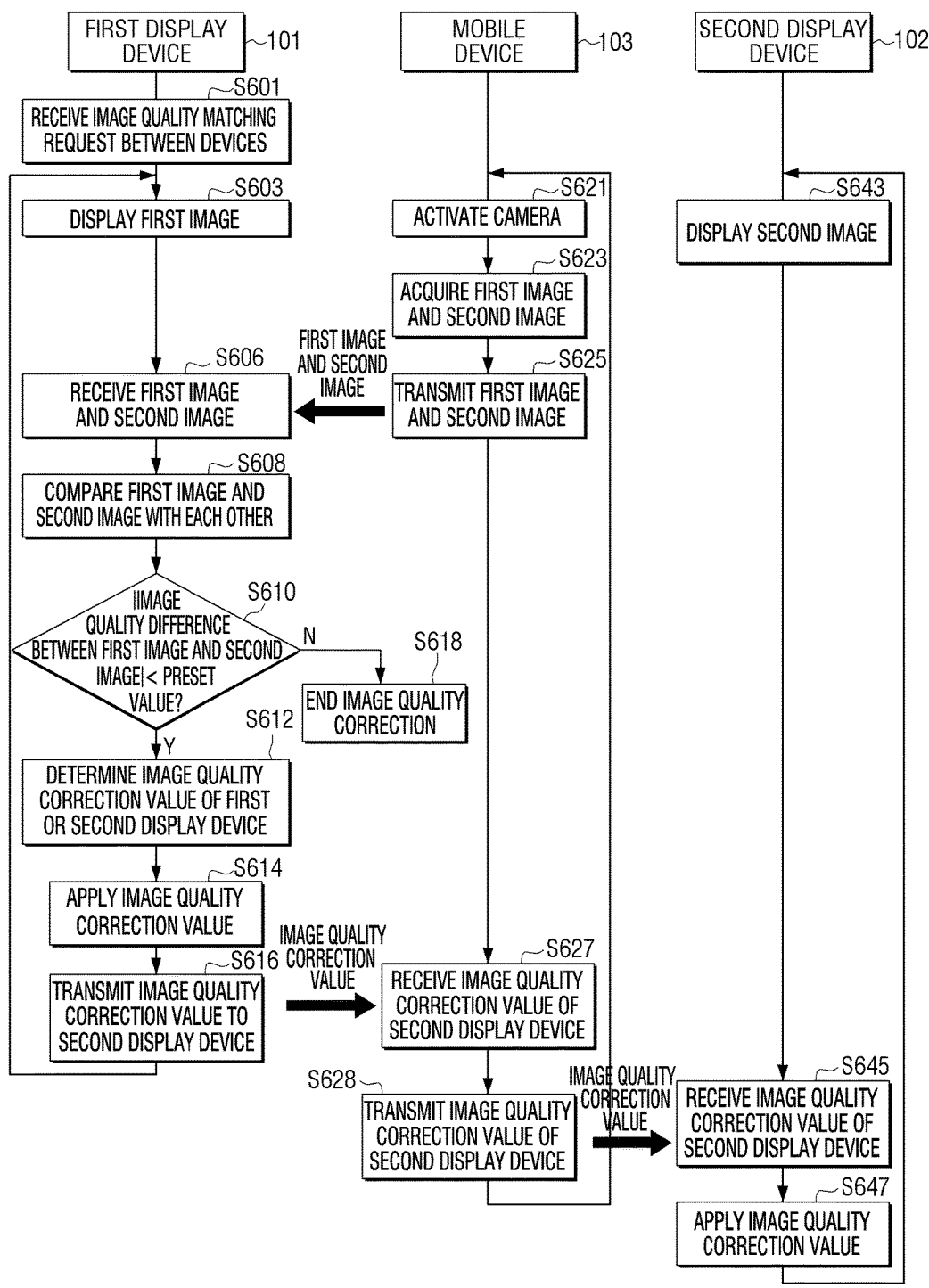
FIG. 6 is a flowchart illustrating a connection control method of the communication system of FIG. 1 according to another exemplary embodiment.

FIG. 6 is a flowchart illustrating a connection control method of a communication system of FIG. 1 according to another exemplary embodiment.

Referring to FIG. 6, a first display device 101 may receive, from a user, a request for image quality matching between first and second display devices 101 and 102 (S601). For example, the user may execute an OSD menu of the first display device 101 through operation of a user inputter 130 of the first display device 101, and, through the OSD menu, the user may request matching of image qualities between the first and second display devices 101 and 102.

In response to the user's image quality matching request (S601), the controller 170 of the first display device 101 may provide, to the mobile device 103, a signal for requesting activation of the image acquirer 140, i.e., the camera, of the mobile device 103. In response to the camera activation signal from the first display device 101, the controller 170 of the mobile device 103 may activate the image acquirer 140, i.e., the camera, of the mobile device 103 (S621). At this time, the first display device 101 may display the first image through the display 120 of the first display device 101 (S603), and the second display device 102 may display the second image through the display 120 of the second display device 102 (S643).

In the case in which the camera is activated (S621), the image acquirer 140 of the mobile device 103 may acquire the first image that is displayed on the first display device 101 and the second image that is displayed on the second display device 102 (S623). Further, the image acquirer 140 of the mobile device 103 may transmit the acquired first and second images to the first display device 103 (S625). The first display device 101 may receive the transmitted first and second images (S606).

The first display device 101 may compare the received first and second images with each other (S608). If it is determined that a difference in image quality between the first image and the second image is equal to or lower than a predetermined value as the result of the comparison (S610), the controller 170 of the first display device 101 may end the image quality correction process of the first display device 101 or the second display device 102 (S618). In contrast, if the difference in image quality between the first image and the second image is higher than the predetermined value (S610), the controller 170 of the first display device 101 may determine the image quality correction value of the first display device 101 or the second display device 102 (S612). The controller 170 of the first display device 101 may acquire pixel values from the first image and the second image as described above, and may determine the image quality correction values of the first display device 101 and the second display device 102 with reference to a table depending on the difference between average values of the pixel values of the first image and the second image (S612).

If the image quality correction value of the first display device 101 is determined (S612), the controller 170 of the first display device 101 may adjust the image quality of the display 120 of the first display device 101 through application of the determined image quality correction value (S614). As the result of the image quality adjustment, the controller 170 of the first display device 101 may display the first image to which the image quality correction value has been applied through the display 120 of the first display device 101 (S603). If the image quality correction value of the second display device 102 is determined (S612), the communicator 160 of the first display device 101 may transmit the image quality correction value of the second display device 102 to the mobile device 103 or the second display device 102 (S616). If the communicator 160 of the mobile device 103 receives the image quality correction value (S627), the controller 170 of the mobile device 103 may determine that the image quality matching process is not ended, and may continuously activate the image acquirer 140, i.e., the camera, of the mobile device 103. Further, the communicator 160 of the mobile device 103 may transmit again the received image quality correction value to the second display device 102 (S628).

The communicator 160 of the second display device 102 may receive the image quality correction value of the second display device 102 (S645). The controller 170 of the second display device 102 may adjust the image quality of the display 120 of the second display device 102 through application of the received image quality correction value (S647). As the result of the image quality adjustment, the controller 170 of the second display device 102 may display the second image to which the image quality correction value has been applied through the display 120 of the second display device 102 (S643).

In the case in which the first display device 101 and the second display device 102 again display the first image and the second image to which the image quality correction values have been applied, the camera of the mobile device 103 may again acquire the first image and the second image, and may transmit the acquired first and second images to the first display device 101. The communicator 160 of the first display device 101 may again receive the first image and the second image from the mobile device 103. Further, the controller 170 of the first display device 101 may repeat S603 to S616 until the difference between the first image and the second image to which the image quality correction values have been applied becomes equal to or smaller than a predetermined value. That is, the controller 170 of the first display device 101 may repeat S603 to S616 so that the image quality of the first image that is displayed on the first display device 101 becomes equal to or similar to the image quality of the second image that is displayed on the second display device 102.

If the difference between the first image and the second image is equal to or smaller than the predetermined value, the controller 170 of the first display device 101 may end the image quality correction of the first display device 101 and the second display device 102. The controller 170 of the first display device 101 may notify a user, through the display 120, that the image qualities of the images of the first display device 101 and the second display device 102 are matched.

It should be understood that the above-described exemplary embodiments may be realized in the form of hardware, software, or a combination thereof. The software may be stored, regardless of whether the software can be deleted or re-written, for example, in a volatile or nonvolatile storage device, such as a ROM, in a memory, such as a RAM, a memory chip, a device, or an integrated circuit, or in a recording medium that can be optically or magnetically recordable and readable through a machine (e.g., computer), such as a CD, a DVD, a magnetic disc, or a magnetic tape.

The image quality matching method among the plurality of display devices may be implemented by a computer or a portable terminal, which includes a controller and a memory, and the memory may be an example of a machine-readable recording medium that is suitable to store a program or programs including instructions for implementing the described embodiments. Accordingly, the present disclosure includes a program including codes for implementing the device and method described in the claims and a machine (computer)-readable recording medium storing such a program. In addition, a user may selectively limit the operation according to the embodiments to a portable terminal or extend the operation to be in association with a server through a network.

While the present disclosure has been shown and described with reference to certain embodiments thereof, it will be understood by those skilled in the art that various changes in form and detail may be made therein without departing from the spirit and scope, as defined by the appended claims.

What is claimed is:

1. A mobile device that matches image qualities among a plurality of display devices, the mobile device comprising:
    an image acquirer configured to acquire a first acquired image corresponding to a first displayed image that is being displayed on a first display device and a second acquired image corresponding to a second displayed image being displayed on a second display device;
    a controller configured to:
        obtain a plurality of pixel values in corresponding positions in each of the first acquired image and the second acquired image, the corresponding positions being determined based on cross points which are obtained by respectively dividing the first acquired image and the second acquired image into a matrix of equal parts positioned at predetermined intervals in horizontal direction and vertical directions, and
        determine an image quality correction value for the first display device based on the plurality of pixel values in each of the first acquired image and the second acquired image, so that a first image quality of the first displayed image is made substantially equal to a second image quality of the second displayed image, wherein the image quality correction value of the first display device is determined so that a difference in image quality between the first displayed image and the second displayed image becomes equal to or lower than a predetermined value; and
    a communicator configured to transmit the image quality correction value to the first display device.

2. The mobile device as claimed in claim 1, wherein the first displayed image and the second displayed image have the same source.

3. The mobile device as claimed in claim 1, wherein the controller further determines another image quality correction value for the second display device, and
    the communicator transmits the another image quality correction value to the second display device.

4. A system comprising:
    a first display device displaying a first displayed image;
    a second display device displaying a second displayed image; and
    a mobile device configured to:
        acquire a first acquired image corresponding to the first displayed image and a second acquired image corresponding to the second displayed image,
        obtain a plurality of pixel values in corresponding positions in each of the first acquired image and the second acquired image, the corresponding positions being determined based on cross points which are obtained by respectively dividing the first acquired image and the second acquired image into a matrix of equal parts positioned at predetermined intervals in horizontal direction and vertical directions,
        determine an image quality correction value for the first display device, based on the plurality of pixel values in each of the first acquired image and the second acquired image, so that a first image quality of the first displayed image is made substantially equal to a second image quality of the second displayed image, wherein the image quality correction value of the first display device is determined so that a difference in image quality between the first displayed image and the second displayed image becomes equal to or lower than a predetermined value; and
        transmit the image quality correction value to the first display device,
    wherein the first display device is configured to correct the first image quality of the first displayed image being displayed on the first display device using the image quality correction value received from the mobile device.

5. A method, performed by a mobile device, for matching image qualities among a plurality of display devices, the method comprising:
    acquiring a first acquired image corresponding to a first displayed image being displayed on a first display device and a second acquired image corresponding to a second displayed image being displayed on a second display device;

obtaining a plurality of pixel values in corresponding positions in each of the first acquired image and the second acquired image, the corresponding positions being determined based on cross points which are obtained by respectively dividing the first acquired image and the second acquired image into a matrix of equal parts positioned at predetermined intervals in horizontal direction and vertical directions, and;

determining an image quality correction value for the first display device, based on the plurality of pixel values in each of the first acquired image and the second acquired image, so that a first image quality of the first displayed image is made substantially equal to a second image quality of the second displayed image, wherein the image quality correction value of the first display device is determined so that a difference in image quality between the first displayed image and the second displayed image becomes equal to or lower than a predetermined value; and transmitting the image quality correction value to the first display device.

6. The method as claimed in claim 5, wherein the first displayed image that is being displayed on the first display device and the second displayed image that is being displayed on the second display device have a same source.

7. The method as claimed in claim 5, further comprising:

determining another image quality correction value for the second display device; and transmitting the another image quality correction value to the second display device.

* * * * *